United States Patent
Grohmann et al.

(10) Patent No.: US 7,914,642 B2
(45) Date of Patent: Mar. 29, 2011

(54) METHOD FOR CONNECTING THE ENDS OF PROFILED SEALING ELEMENTS, AND DEVICE FOR CARRYING OUT SAID METHOD

(75) Inventors: Klaus Grohmann, Hersdorf (DE);
Lothar Thommes, Bitburg-Stahl (DE);
Bernhard Kohlen, Ingendorf (DE)

(73) Assignee: Grohmann Engineering GmbH, Prüm (DE)

( * ) Notice: Subject to any disclaimer, the term of this patent is extended or adjusted under 35 U.S.C. 154(b) by 672 days.

(21) Appl. No.: 11/989,335

(22) PCT Filed: Aug. 3, 2006

(86) PCT No.: PCT/EP2006/007675
§ 371 (c)(1),
(2), (4) Date: Jan. 24, 2008

(87) PCT Pub. No.: WO2007/019961
PCT Pub. Date: Feb. 22, 2007

(65) Prior Publication Data
US 2009/0126868 A1    May 21, 2009

(30) Foreign Application Priority Data
Aug. 17, 2005  (DE) .......................... 10 2005 039 214

(51) Int. Cl.
*B29C 65/14* (2006.01)
*B29C 65/20* (2006.01)
(52) U.S. Cl. ............... 156/304.6; 156/272.2; 156/379.8; 156/502; 156/507; 296/93
(58) Field of Classification Search ............... 156/272.2, 156/275.7, 304.1, 304.2, 304.3, 304.6, 379.8, 156/502, 503, 505, 507, 508, 509; 296/93
See application file for complete search history.

(56) References Cited

U.S. PATENT DOCUMENTS

| 6,940,046 | B2 * | 9/2005 | Dragon ..................... 219/243 |
| 2003/0155341 | A1 | 8/2003 | Horst et al. |
| 2005/0211373 | A1 * | 9/2005 | Tomasetti et al. .......... 156/304.5 |

FOREIGN PATENT DOCUMENTS

| DE | 30 12 387 | 10/1981 |
| DE | 39 06 278 | 8/1990 |
| DE | 101 38 781 | 2/2003 |
| EP | 0 665 261 | 8/1995 |
| WO | WO 97/06205 | 2/1997 |

OTHER PUBLICATIONS

Abstract and Machine Translation for DE 3906278 A1. Date Unknown.*
Search Report dated Nov. 13, 2006 for corresponding International Application No. PCT/ED2006/007675.

* cited by examiner

*Primary Examiner* — Michael A Tolin
(74) *Attorney, Agent, or Firm* — Cohen Pontani Lieberman & Pavane LLP

(57) ABSTRACT

The invention relates to a method for process automation, for connecting the edge of two correspondingly profiled ends of at least one profiled sealing element, said profiled sealing element being already applied to a surface of a vehicle or a vehicle component. The invention also relates to a device for carrying out said method.

19 Claims, 2 Drawing Sheets

US 7,914,642 B2

METHOD FOR CONNECTING THE ENDS OF PROFILED SEALING ELEMENTS, AND DEVICE FOR CARRYING OUT SAID METHOD

CROSS-REFERENCE TO RELATED APPLICATIONS

This is a U.S. national stage of International Application No. PCT/EP2006/007675, filed on 3 Aug. 2006. Priority is claimed on German Application No. 10 2005 039 214.8, filed on 17 Aug. 2005.

BACKGROUND OF THE INVENTION

1. Field of the Invention

The invention pertains to a method for connecting the similarly profiled ends of at least one sealing strip at the butt joint present between them after the strip has been attached to the surface of a vehicle or vehicle component. The invention also pertains to a device for implementing the method.

2. Description of the Related Art

Profiled sealing strips on vehicles or vehicle components serve to seal off a movable vehicle component such as a door against the body frame when the door is closed. These types of profiled sealing strips are usually attached to the vehicle door by means of auxiliary devices comprising several segments.

To shorten production times and to lower investment costs, DE 101 38 781 A1 proposes a method for attaching a seal to a vehicle door, in which the seal, which is in the form of an endless profiled strip on a roll, is pulled off the roll, and the adhesive surface on the strip is rolled onto the door all the way around along the line indicating where the strip is to be attached. The words "rolled onto" are used to express the idea that, to attach the strip to the door, pressure rolls are used to press the seal along successive portions of its length onto the surface of the vehicle door, following along the predefined mounting line. The advantage of this rolling method is that it allows an all-around seal to be installed in its entirety in a single continuous step. The attachment occurs in this case by means of a robot, which has guide means for the sealing strip. After the attachment process is over, the strip is cut by a cutting device on the robot to form abutting ends. The ends of the profiled sealing strip resting against each other at this butt joint can shift position with respect to each other. As a result, not only the overall visual impression of the seal is disturbed, but also it becomes easier for damage to occur to the seal in the area of the butt joint. Certain types of vehicles, furthermore, such as all-terrain vehicles require a closed-door seal all the way around the door to provide a water-tight barrier.

It would therefore be desirable to have a way of connecting the two abutting ends of the profiled sealing strip without losing the mounting and cost advantages offered by the previously described rolling method for attaching the sealing strip.

SUMMARY OF THE INVENTION

The invention is therefore based on the task of creating a method, suitable for process automation, for connecting the two similarly profiled abutting ends of at least one profiled sealing strip, which has previously been attached to the surface of the vehicle or vehicle component. In addition, an advantageous device for implementing the method is also to be provided.

This task is accomplished by a method with the features of Claim 1.

The method is suitable for connecting the two similarly profiled abutting ends of a single profiled stealing strip for the production of, for example, a door or sliding roof seal. The method can also be used, however, to connect two similarly profiled abutting ends of two profiled sealing strips which have previously been attached to the vehicle or vehicle component. The only requirement is that the two abutting ends be similarly profiled.

The ends of the profiled sealing strip attached to the surface of a vehicle or vehicle component initially lie flush against each other at the butt joint present between them. So that the two ends can be connected permanently together in this joint area, it is first necessary to produce a temporary working gap between the two ends. This is done by moving the ends of the minimum of one profiled sealing strip away from each other. In particular, grippers can be used to grip each of these ends a certain distance away from the joint and to pull the ends apart. The distance that each gripper moves is only a few millimeters. As a result, a gap is formed between the ends of the profiled sealing strip, which gap tapers down in a wedge-like manner toward the surface of the sealing strip by which the strip is attached to the surface of the vehicle or vehicle component. Alternatively, the working gap can be produced by using a hold-down device to compress the strip a certain distance away from the butt joint. The deformation of the profiled sealing strip has the effect of forming a working gap at the butt joint.

A welding film is introduced into this working gap. By the input of thermal energy, this film is welded to the ends of the minimum of one profiled sealing strip after the working gap at the butt joint has been closed again. The working gap is closed either by releasing the grip of the grippers on the profiled ends or by actively moving the grippers toward each other. In addition, pressure can be exerted on the ends of the profiled sealing strip in such a way as to assist the welding at the butt joint. The welding film introduced into the working gap consists, for example, of a thermoplastic elastomer, which bonds to the sealing material under the action of heat. Depending on the materials which are to be welded (welding film/profiled sealing strip), a temperature of approximately 100-300° C. will be required for this purpose.

The required thermal energy can be supplied to the profiled ends or to the welding film or to both the profiled ends and the welding film by conduction, radiation, or convection. In particular, the thermal energy can be supplied by conduction by bringing the profiled ends in the working gap to be heated into temporary contact with a hotter body such as a heating plate. To guarantee the temperature required for welding, it is necessary, when introducing the thermal energy, to take into consideration the subsequent heat loss, which is determined by the chronological sequence of the individual steps, by the selected materials, and by the ambient conditions.

To prevent migration of the profiled ends at the butt joint when the welding operation is being actively assisted by the grippers, in an advantageous embodiment of the invention a shaped gripper conforming to the shape of the profile is also used. The only function of the shaped gripper is to stabilize and to guide the profiled sealing strip in the immediate area of the butt joint. It exerts no force acting in the axial direction of the profiled sealing strip.

An advantageous device for implementing the method comprises means for producing the working gap at the ends of the profiled sealing strip, a welding film feeder, a heating system for welding the welding film to the ends of the profiled sealing strip, and a positioning unit acting in at least two planes to move the welding film feeder and the heating system between a rest position and a working position.

So that the inventive device can be integrated into a production line for an automobile, it is preferably mounted on the arm of a robot, which moves the device into a defined position with respect to the butt joint between the profiled ends to be connected to each other. By way of kinematic reversal, it is also possible for the device used to implement the method to be stationary, e.g., it can be mounted on a support frame, and for the body part, to which the seal has already been applied, to be moved in such a way as to orient it with respect to the device.

The means for producing the working gap preferably comprises two grippers, each with two arms which can move toward and away from each other, and at least one drive for changing the distance between the two grippers in the axial direction of the length of the profiled strip in the area of the butt joint. The two arms of each gripper are preferably mounted so that they can pivot with respect to each other and are designed in the form of plates in the area of the gripping jaws to avoid damage to the sensitive profiled sealing strip. Each gripper is equipped with its own pivoting drive to pivot it.

Alternatively, the means for producing the working gap can have two hold-down devices, which can be moved by a drive between a starting position and a working position. In the working position, the hold-downs press down on the profiled sealing strip on both sides of the butt joint. In the rest position, the hold-down devices are located above the profiled sealing strip. The hold-down devices can be moved into and out of the working position by a driven linear slide or pivot arm.

The heating system of the device preferably has a heating plate, which is heated in particular by an electrical resistance heating system. The plate itself can be made of ceramic, for example. The thickness of the plate is coordinated with the width of the working gap, so that the surfaces of the plate come in contact with the ends of the profiled strip.

The welding film feeder has two clamping jaws which can be moved toward each other to hold the welding film taut; the two clamping jaws have aligning notches, the size of which is equal at least to the cross section of the profiled sealing strip surrounded by the clamping jaws. When the clamping jaws are moved toward each other, the welding film present between the clamping jaws is stretched out taut. The welding film can be fed as individual pieces or as a continuous length to the clamping jaws for the welding process. If the welding film is fed in pieces, the pieces are first made by stamping, for example, and then inserted between the clamping jaws by a manipulator. In a preferred embodiment of the invention, however, the welding film feeder has a supply spool and a wind-up spool for a web-like welding film and guide means between the spools, by means of which the web-like welding film which has been pulled off the supply spool is conducted between the clamping jaws in the area of the aligning notches. During the welding process itself, the welding film is clamped between the clamping jaws. Then the clamping jaws are released, and a fresh section of welding film is pulled from the supply spool and fed to the next process. As a result of the welding of the film web to the ends of the profiled stealing strip in the area of the butt joint, a piece of film corresponding to the cross section of the profiled strip is removed from the film web. For this reason, the width of the film web must be greater than the maximum height of the cross section of the butt joint, because the film web would otherwise be separated by the welding process and therefore could not be wound up and driven by the wind-up spool.

DETAILED DESCRIPTION OF THE PREFERRED EMBODIMENTS

Figure 1:
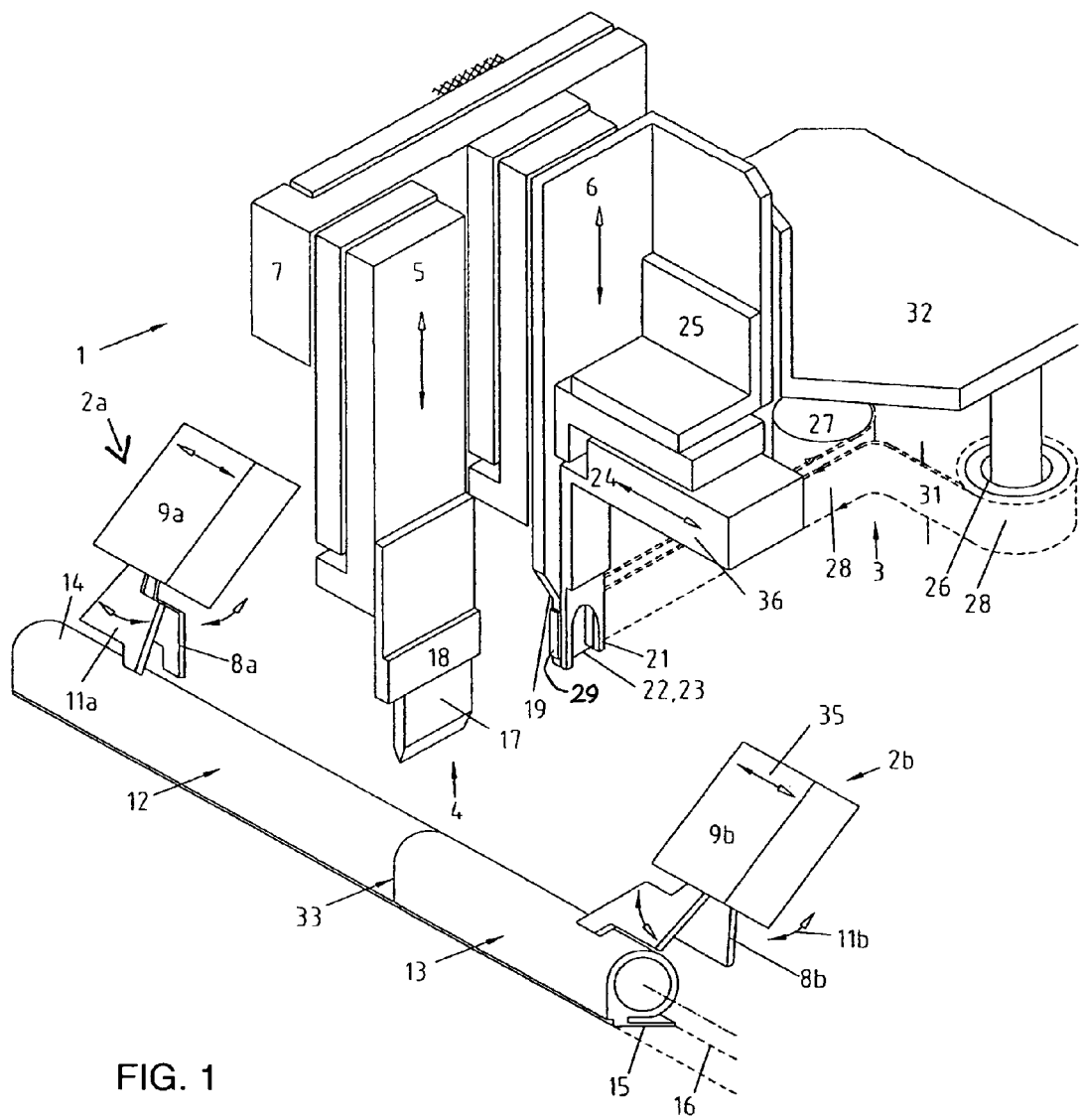
FIG. 1 shows a schematic diagram, in perspective, of a device for implementing the inventive method.

The device for implementing the method, designated overall by the number 1, consists essentially of two profiled grippers 2a, 2b, a welding film feeder 3, and a heating system 4. The welding film feeder 3 and the heating system 4 are attached by vertical slides 5, 6 to a common horizontal slide 7. In the exemplary embodiment shown here, the device 1 is supported via the horizontal slide 7 on a stationary stand (not shown for the sake of clarity).

The profiled grippers 2a, 2b each have two opposing, pivotable arms 8a, 8b, which can be pivoted in the direction of the arrows 11a, 11b by means of a pivoting drive mounted in the housing 9a, 9b. The distance between profiled grippers 2a, 2b can also be changed by means of at least one drive (not shown in FIG. 1), which moves the grippers in the direction of the arrows 35.

In FIG. 1, the arms 8a, 8b are resting on the ends 12, 13 of a profiled sealing strip 14, which has previously been attached to the surface of the vehicle door. For this purpose, an adhesive surface, which is glued down along the lines 16a, 16b intended for the attachment, is provided on the bottom surface of the base 15 of the profile of the hollow-chambered sealing strip.

At one end, the heating system 4 has a heating plate 17 of ceramic material, which tapers down to a knife edge. The heating plate 17 is mounted in a holder 18 with an electric resistance heater for tempering the heating plate 17. The holder 18 is mounted on the vertical slide 5, which, in FIG. 1, is in its upper end position above the butt joint 33 between the ends 12, 13 of the profiled sealing strip 14. From this position, the heating plate 17 can be moved by the vertical slide 5 into its working position, as will be explained below on the basis of FIG. 2.

The welding film feeder designated overall by the number 3 has a first stationary clamping jaw 19 and a movable clamping jaw 21, which can be moved toward and away from the stationary jaw 19. At their bottom ends, the two clamping jaws 19, 21 have aligning notches 22, 23, which are slightly larger than the cross section of the profiled sealing strip 14. The profiled sealing strip can therefore be held in the notches 22, 23 of the clamping jaws 19, 21. The movable clamping jaw 21 is mounted on a horizontal slide 24, by means of which the clamping jaws can be pressed against each other and moved away from each other again. This horizontal slide 24 for holding the movable clamping jaw 21 is itself mounted by way of a bracket 25 on the vertical slide 6. The vertical slide 6 is located in an upper end position above the profiled sealing strip, and the horizontal slide 7 is in a rear terminal position, which defines the rest position of the welding film feeder 3. A spool stand 32 for a supply spool 26 and a wind-up spool 27 for a web-like welding film 28 are also mounted on the vertical slide 6. The welding film 28 pulled from the supply spool 26 is conducted by guide means (not shown) between the clamping jaws 19, 21 at the level of the notches 22, 23 and pulled around the edge 29 of the stationary clamping jaw 19, i.e., the edge in the forward position in the figure. The height 31 of the film web is slightly greater than the maximum height of the notches 22, 23 to guarantee that the used-up film remaining after the welding of the film web can be transported reliably to the wind-up spool 27.

Figure 2A:
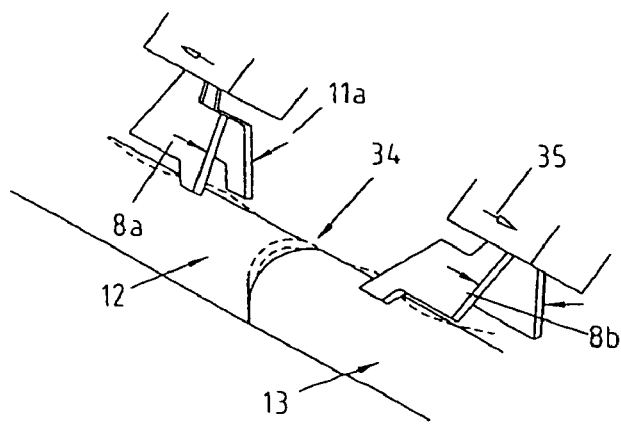
FIGS. 2a-d show schematic diagrams of the various steps of the inventive method.

The method according to the invention is explained in greater detail below:

First, the vehicle door with the profiled sealing strip 14 already attached to it is brought into the processing position shown in FIG. 1. Then a working gap 34 must be produced so that the butt joint 33 between the two similarly profiled ends 12, 13 of the sealing strip 14 can be connected. For this purpose, the abutting ends 12, 13, as shown in FIG. 2a, are moved away from each other by the use of gripper arms 8a, 8b, which grip the ends of the strip a certain distance away from the butt joint 33, pull them apart in the direction of the arrows 35, and hold them in this position. As a result, the working gap 34, which tapers down in a wedge-like manner toward the base of the profiled strip 15, is formed.

Then the heating plate 17 of the heating system 4, with the wedge-shaped tip in front, is lowered into the working gap 34. For this purpose, the vertical slide 5 is moved downward out of the end position above the butt joint 33 as shown in FIG. 1. The ends of the strip thus come into contact with the surfaces of the heating plate 17. The conduction of the heat can be promoted by using the grippers 2a, 2b to move the ends 12, 13 of the strip toward each other as shown by the arrows 35 in FIG. 2b after the heating system 4 has been lowered. After the predetermined length of time required to allow the necessary heat input has passed, the heating system 4 is removed from the working gap 34 by the vertical slide 5. If the ends 12, 13 of the profiled sealing strip 34 have been squeezed together, as shown in FIG. 2b, the grippers 2a, 2b must first be moved away from each other again, as shown in FIG. 2c, to obtain the working gap 34.

To introduce the welding film 28 into the working gap, a piece of fresh welding film is pulled from the supply spool 26 while the clamping jaws 19, 21 are open and brought into the area of the notch 23 in the movable clamping jaw 21. Then the movable clamping jaw 21 is pushed against the stationary clamping jaw 19 in the direction of the arrow 36 by the horizontal slide 24. As a result, the welding film 28 is held taut between the two clamping jaws. The taut piece of welding film 28 is now introduced into the working gap by the use of the vertical and horizontal slides 6, 7 to move the welding film feeder 3 into position. The clamping jaws 19, 21 thus surround the profiled sealing strip 14, as shown in FIG. 2d. Then the working gap 34 at the butt joint 33 is released, so that the ends 12, 13 of the profiled sealing strip 14 arrive in contact with the welding film 28. The contact between the welding film 28 and the ends 12, 13 is assisted by using the grippers 2a, 2b to press the ends in the direction of the arrows 35 shown in FIG. 2d.

The thermal energy just introduced into the ends of the profiled sealing strip 14 (FIG. 2b) has the effect of welding the tautly held section of film 28 to the ends 12, 13 and thus of connecting them together at the butt joint 33. After the welding is complete, the welding film feeder 3 is moved up and away from the profiled sealing strip 14, so that the device 1 can be prepared to connect the abutting ends of the next sealing strip. The web-like welding film 28 has been severed along the contour of the profiled sealing strip 14, so that the film web now has a notch corresponding to the cross section of the profiled sealing strip 14 at this point. After the clamping jaws have been released, the used-up part of the film web with this notch is pulled by the wind-up spool 27 around the edge 29 of the stationary clamping jaw 19 until the notch is aligned with the notch 22 in the stationary jaw. As a result, it is guaranteed that only one layer of the web-like film web is welded to the ends of the profiled sealing strip. An alternative solution consists in winding up the used-up film web by way of separate deflecting rolls on a wind-up, spool located on the opposite side of the clamping jaws 19, 21 from the supply spool.

Figure 2B:
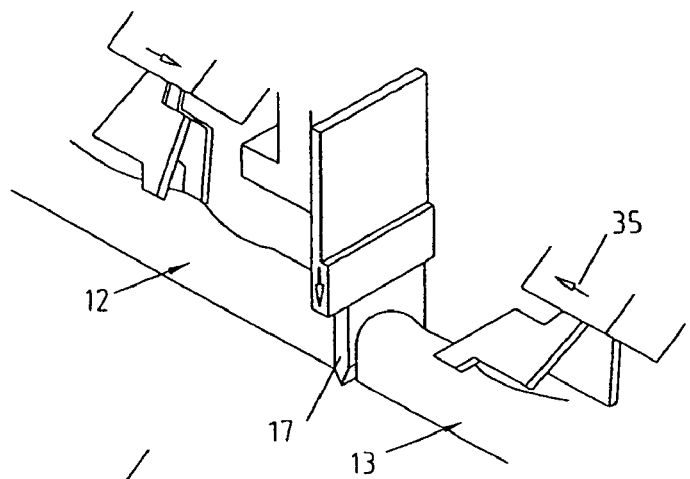
Figure 2C:
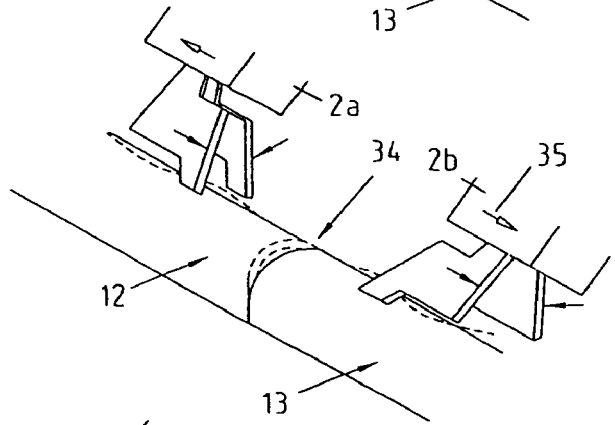
Figure 2D:
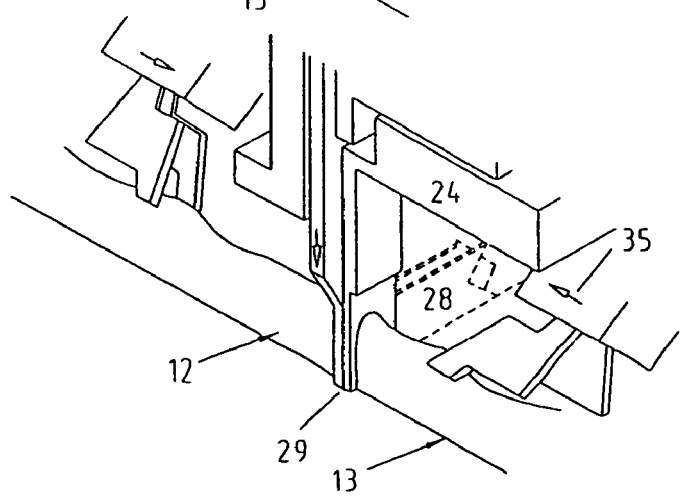

The pressing-together of the ends 12, 13 of the profiled sealing strip 14 illustrated in FIGS. 2b and 2d serves merely to support the inventive method; it is not mandatory. In particular, it is sufficient for the welding of the ends of the sealing strip with the welding film (see FIG. 1d) simply to pivot the gripper arms 8a, 8b away from each other to release the ends 12, 13. The natural tension of the elastic sealing strip is sufficient to bring the ends of the sealing strip securely against the welding film.

What is claimed is:

1. A method for connecting two similarly profiled ends of at least one profiled sealing strip, wherein the strip is attached to the surface of a vehicle component so that the ends form a butt joint, the method comprising:
    moving the ends away from each other at the butt joint to form a working gap which diverges away from the surface of the vehicle component;
    introducing a welding film into the working gap; and
    closing the ends against the film at the butt joint,
    whereby the ends can be welded to the film by supplying thermal energy.

2. The method of claim 1 wherein the thermal energy is supplied by bringing the ends in the working gap into contact with a body of higher temperature.

3. The method of claim 1 wherein thermal energy is supplied by exposing the working gap to heat radiation.

4. The method of claim 1 wherein thermal energy is supplied by exposing the working gap to a stream of hot gas.

5. The method of claim 1 wherein thermal energy is supplied by heating the welding film before introducing the film into the gap.

6. The method of claim 1 wherein the ends are moved away from each other at the butt joint by
    gripping each end near the butt joint; and
    pulling the ends away from each other to form the working gap.

7. The method of claim 1 wherein the ends are moved away from each other at the butt joint by compressing the ends near the butt joint.

8. The method of claim 1 further comprising aligning the ends which each other by means of a shaped gripper conforming to the shape of the profiled strip.

9. The method of claim 1 further comprising, after closing the ends against the welding film, pressing the ends toward each other.

10. The method of claim 2 further comprising pressing the ends toward each other while the ends in the working gap are in contact with the body of higher temperature.

11. A device for connecting two similarly profiled ends of at least one profiled sealing strip, wherein the strip is attached to the surface of a vehicle component so that the ends form a butt joint, the device comprising:
    means for moving the ends away from each other at the butt joint to form a working gap;
    a welding film feeder for introducing a welding film into the working gap;
    a heating system for supplying thermal energy for welding the welding film to the ends of the profiled sealing strip; and a positioning unit which is effective at least two levels for moving the welding film feeder between a rest position and a working position.

12. The device of claim 11 wherein the device is mounted on the arm of a robot.

13. The device of claim 11 wherein the device is stationary.

14. The device of claim 11 wherein the means for moving the ends away from each other comprises:
   a pair of grippers, each gripper having a pair of gripper arms which can be moved toward and away from each other in order to grip a respective end; and
   at least one drive for moving the grippers toward and away from each other.

15. The device of claim 11 wherein the means for moving the ends away from each other comprises a pair of hold-downs which can be moved between a starting position and a working position.

16. The device of claim 11 wherein the heating system comprises a plate which can be heated and moved into the working gap.

17. The device of claim 11 wherein the heating system comprises an infrared heater.

18. The device of claim 11 wherein the welding film feeder comprises a pair of clamping jaws which can be moved toward and away from each other to stretch the welding film taut, the jaws having respective notches which are aligned with each other and profiled to correspond to the cross-section of the sealing strip.

19. The device of claim 18 wherein the welding film feeder further comprises:
   a supply spool and a wind-up spool for the welding film;
   means for guiding the welding film between the clamping jaws as it is pulled from the supply spool.

* * * * *